(12) United States Patent
Hosterman et al.

(10) Patent No.: US 6,434,895 B1
(45) Date of Patent: Aug. 20, 2002

(54) FOLDABLE TRAILERABLE BUILDING

(75) Inventors: Craig Hosterman, Scio, OR (US); D. L. Bennett, Rathdrum, ID (US)

(73) Assignee: Bendon, L.L.C., Scio, OR (US)

( * ) Notice: Subject to any disclaimer, the term of this patent is extended or adjusted under 35 U.S.C. 154(b) by 0 days.

(21) Appl. No.: 09/653,836

(22) Filed: Sep. 1, 2000

Related U.S. Application Data (60) Provisional application No. 60/153,275, filed on Sep. 9, 1999.

(51) Int. Cl.⁷ .................................................. E04B 1/34
(52) U.S. Cl. ............................. 52/143; 52/79.9; 52/64; 52/65; 52/79.5; 52/66; 52/69; 52/70; 52/71
(58) Field of Search .................... 52/79.9, 64, 65, 52/143, 79.5, 66, 69, 70, 71

(56) References Cited

U.S. PATENT DOCUMENTS

| | | | | |
|---|---|---|---|---|
| 2,259,783 A | * | 10/1941 | Sparling | 52/70 |
| 2,701,038 A | * | 2/1955 | Mooney | 52/66 |
| 2,751,536 A | * | 6/1956 | Donnahue | 52/66 |
| 3,984,949 A | * | 10/1976 | Wahlquist | 52/70 |
| 4,035,964 A | * | 7/1977 | Robinson | 52/66 |
| 4,074,475 A | * | 2/1978 | Wahlquist | 52/70 |
| 4,829,726 A | * | 5/1989 | de Potter d'Indoye | 52/66 |
| 5,706,615 A | * | 1/1998 | Bridges et al. | 52/105 |
| 6,253,498 B1 | * | 7/2001 | Fanucci | 52/69 |

* cited by examiner

*Primary Examiner*—Beth A. Stephan
*Assistant Examiner*—Dennis L. Dorsey
(74) *Attorney, Agent, or Firm*—Cahill, Sutton & Thomas P.L.C.

(57) ABSTRACT

A folded building, after having been trailered on its own wheel assemblies to a site, is unfolded at the site by first reorienting 90° the wheel assemblies attached to each of a pair of side walls and removing an attached trailer hitch. The side walls are drawn apart from one another while having supported by the rolling wheel assemblies. As the side walls are drawn apart, pivotally attached front and rear bifold walls unfold. Each of a pair of foldable roofs attached to a respective one of the side walls is unfolded from a location adjacent the interior of the respective side wall. Roof end caps are attached to the top edges of each of the front and rear walls. After raising the wheel assemblies the building is lowered onto the site. To remove the building from the site, the building is folded by reversing the unfolding steps and the trailer hitch is attached. The building may then be trailered to another site.

26 Claims, 7 Drawing Sheets

CROSS SECTION DETAIL

FIG. 1

FIG. 2 CROSS SECTION DETAIL

FIG. 2A ROOF END CAP

FIG. 3 FRONT PANEL ASSEMBLY

FIG. 4 REAR PANEL ASSEMBLY

Fig. 5 TOP VIEW

Fig. 6 CROSS SECTION DETAIL

Fig. 7 FRONT VIEW (CLOSED)

Fig. 8 TOP VIEW

Fig. 9 SIDE VIEW

FIG. 10
WHEEL ASSEMBLY

FIG. 11
TRAILERING POSITION
(WHEEL DOWN)

FIG. 12
FOLD/UNFOLD POSITION

FIG. 13
WHEEL FLUSH W/ GROUND POSITION

FIG. 14
TRAILER HITCH

FIG. 15

FIG. 16
REAR RETAINING CLAMP

FIG. 17
TYPICAL 4 INTERIOR CORNERS

FOLDABLE TRAILERABLE BUILDING

CROSS-REFERENCE TO RELATED APPLICATIONS

The present application incorporates the subject matter contained in and claims priority to a provisional application entitled "FOLDABLE, TRAILORABLE BUILDING", filed Sep. 9, 1999, assigned Ser. No. 60/153,275 and describing an invention made by the present inventors.

BACKGROUND OF THE INVENTION

1. Field of the Invention

The present invention relates to transportable buildings and, more particularly, to foldable trailerable buildings.

2. Description of Related Art

At construction sites, offices are required for administrative, management and engineering work. Usually, such offices are in the form of conventional trailers with interiors configured to meet the requirements of the work to be preformed therein. These trailers are limited in width due to travel restrictions attendant transport on public roads. To obtain additional width, pairs of trailers are constructed to be joined to one another lengthwise at the building site and thereby provide a double wide trailer. These single or double wide trailers typically rest upon the same wheels used for trailering and jack stands or the like may be placed at the corners to provide further support and rigidity. While these trailers are relatively convenient, they suffer from several limitations. First, the trailering width requires a heavy duty tow-truck and a following vehicle warning motorists of the wide load. Second, the single and double wide trailers are generally built to support relatively light weight in the form of desks, chairs, and beds. Machinery and heavy duty tools can usually not be brought in to the trailer and even if it could, the floor support structure is inadequate to support the weight without creating a hazard. Thus, the single and double wide trailers are generally limited to use as offices at a construction site.

In order to house heavy duty machinery or storage of equipment at a temporary site, a building would have to be erected. Buildings of this type are available in a prefabricated form. Nevertheless, erection and dismantling of such buildings is time consuming and expensive as walls, joists, roofs, doors, etc. must be unpacked and erected. Such erection generally requires cranes or other heavy duty equipment and skilled operators to operate same. Similar equipment and operators must be present during dismantling. Usually, a building kit or prefabricated building is brought to and removed from a site on a flat bed trailer pulled by a heavy duty truck.

SUMMARY OF THE INVENTION

The present invention includes a pair of rigid side walls having bi-fold end walls which permit the side walls to be brought together with the end walls folded therebetween. Each roof half folds downwardly along the interior of its respective side wall. A set of realignable wheel assemblies is disposed at the opposed approximate midpoints of the side walls to provide a rolling surface for lateral movement of the side walls during unfolding and folding of the building. For transport, the sets of wheel assemblies are reoriented 90° into alignment with the side walls. In the folded state, a hitch assembly is attached to the front end, which hitch assembly precludes separation of the side walls. A locking bar is disposed at the rear end to prevent separation of the side walls. Jacks or the like may be disposed at each of the four corners of the building to raise and lower the building during repositioning of the sets of wheels and during placement of the building on and off the ground.

It is therefore a primary object of the present invention to provide a foldable trailerable building.

Another object of the present invention is to provide a relatively light weight foldable trailerable building.

Yet another object of the present invention is to provide a foldable building with a set of wheels that may be reoriented to provide the support during folding and unfolding of the building and to permit trailering of the folded building.

Still another object of the present invention is to provide a building having side walls, foldable end walls, and foldable roof-halves joined to one another by hinges.

A further object of the present invention is to provide a foldable and unfoldable building that may be rapidly situated upon and removed from a site.

A yet further object of the present invention is to provide a foldable trailerable building that is weather proof when erected.

A still further object of the present invention is to provide a method for folding and unfolding a trailerable building.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
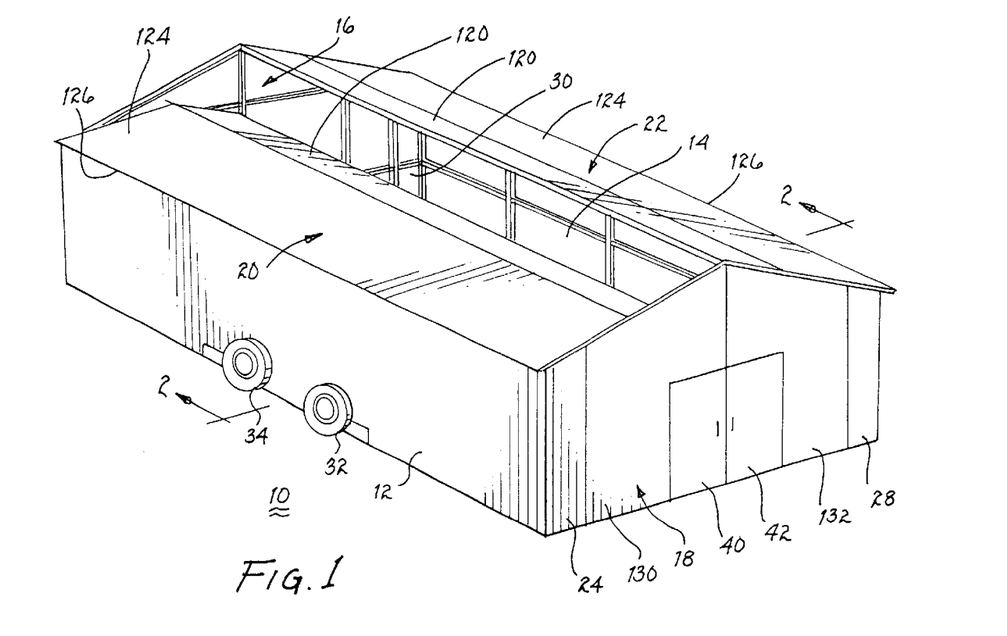
FIG. 1 is a view of a partially erected building.

Referring to FIG. 1, there is shown a nearly erected foldable trailerable building 10. The building includes a pair of side walls 12, 14 joined to one another by foldable rear wall 16 (bifold rear wall) and foldable front wall 18 (bifold front wall). A foldable roof 20 is pivotally attached to the upper part of side wall 12 and a similar foldable roof 22 is pivotally attached to the upper part of side wall 14. Side wall 12 includes a fixedly attached front section 24 and a similar rear section 26 (see FIG. 2) also permanently attached to the side wall. Side wall 14 includes a permanently attached front section 28 and a permanently attached rear section 30 (see FIG. 2). One or more wheel assemblies 32, 34 may be attached to side wall 12. Similar wheel assemblies 36, 38 are attached to side wall 14 (see FIG. 5). One or more doors 40, 42 may be hingedly attached in a door frame in front wall 18; one or more similar doors (not shown) may be attached also to rear wall 16.

Certain interior details and foldable roofs 20, 22 will be described with particular reference to FIG. 2. Rear wall 16 is a bi-fold wall formed of first wall 50 and second wall 52 hingedly attached to one another at uprights 54, 56, which uprights extend downwardly from apex 58. Preferably, hinges are located proximate apex 58, intermediate pairs of cross members 60, 62 and 64, 66 and base members 68, 70. First wall 50 is hingedly attached to upright 80 of rear section 26 by hinges interconnecting it with upright 82 of the first wall. For structural robustness, the hinges should be located proximate cross members 60 and 64 and base member 68 of the first wall and the corresponding cross members 84, 86 and base member 88 of rear section 26. Second wall 52 is similarly hingedly attached to upright 90 of rear section 30 with hinges located upon upright 92 proximate cross members 62, 66 and base member 70 of the second wall; these hinges would positionally correspond with cross members 94, 96 and base member 98 of rear section 30.

Figure 2:
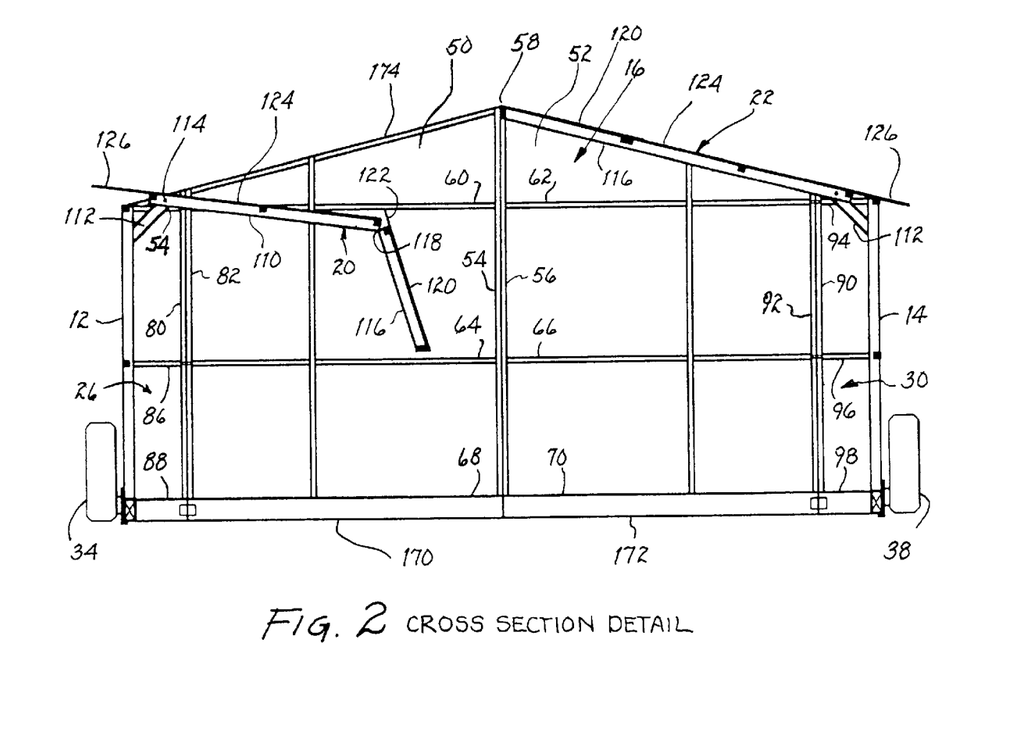
FIG. 2 is a cross sectional view taken along lines 2—2 as shown in FIG. 1.

Foldable roof 20 (shown partly folded in FIG. 1) includes a first arm 110 pivotally secured to brace 112 extending upwardly and inwardly from side wall 12 by a pivot 114 (or hinge), as shown in FIG. 2. A second arm 116 is pivotally secured to the first arm by a pivot 118 (or hinge). Sheet material, such as a sheet of aluminum, is supported by second arm 116 and includes an overlap 122 located in overlapped relationship with the proximal end of first arm 110. Further sheet material 124 is secured to first arm 110 and includes an overlap section 126 which extends outwardly beyond side wall 12 to form an eave upon erection of foldable roof 20. Foldable roof 22 is illustrated in FIG. 1 in its erected configuration. The elements of foldable roof 22 are identical with those described with respect to foldable roof 20. Moreover, foldable roof 22 also includes sheet material 120 overlapping sheet material 124 to prevent intrusion of water, snow, etc and overlap 126 extends beyond side wall 14 to serve in the manner of an eave. The number of pairs of arms and braces (116, 110, 112) for each of foldable roofs 20, 22 is primarily a function of the length of side walls 12, 14, the weight of the sheet material attached thereto and the degree of robustness necessary to satisfy structural and environmental criteria.

Figure 2A:
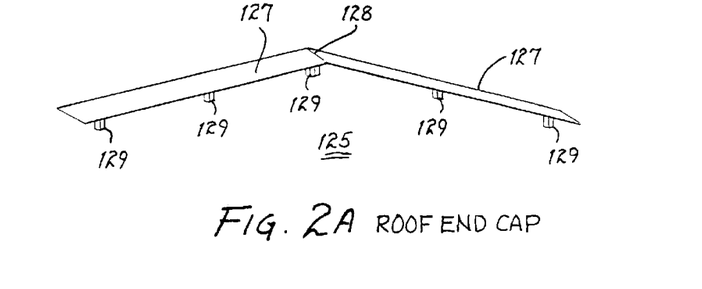
FIG. 2A illustrates a roof end cap mountable at each of the opposed ends of the building.

From the above description of the folding of foldable roofs 20, 22 interior of rear and front section 26, 28, the two roof sections must terminate interior of the front and rear walls. To render the resulting exposed areas at the opposed ends of the building weather proof, a roof end cap 125 as shown in FIG. 2A, is used at each end of the building. The roof end cap includes a strip 127 of sheet material having a fold at apex 128 and extending for the width of the adjoining roof sections. The roof end cap is attached and retained in place by a plurality of studs 129 extending into respective apertures formed in slanted members 174 of rear wall 16 and slanted members 148 of front wall 18. Alternatively, receivers may be attached to the slanted members for receiving the studs. Necessarily, each end cap must overlap the adjacent section of the respective foldable roof. Preferably, each roof end cap is of sufficient width to provide an eave over the corresponding end of the building. It is to be noted that locking mechanisms, such as removable pins, etc., may be used to engage and retain the studs in locked engagement with the respective slanted members. Storage of the two roof end caps, detachably attached to the opposed roof ends, within the trailerable configuration of the building is easily accomplished through retaining brackets attached to the inside surface/cross members of the side walls. Other locations for storage or securing devices will be apparent to those skilled in the art.

Figure 3:
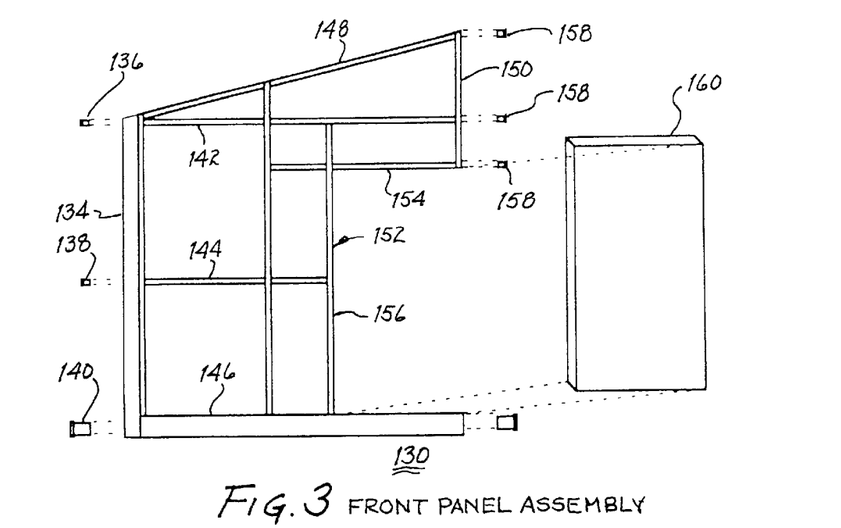
FIG. 3 illustrates one of the front panels and associated door.

Front wall 18 (see FIG. 1) is formed of a pair of panels 130, 132 hingedly secured to one another and to front sections 24, 28. As these panels are mirror images of one another, only the structure of panel 130 will be described with reference to FIG. 3. As front sections 24, 28 are duplicates of rear sections 26, 30 they need not be described in detail. Panel 130 includes an upright 134 hingedly secured to the end upright (80) of front section 24 by hinges, such as hinges 136, 138 and 140 positionally corresponding with cross members 142, 144 and base member 146. The panel includes a slanted member 148 commensurate with the slope of foldable roof 20. An upright 150 extends downwardly from the apex of the slanted member to door frame 152 defined by cross member 154, upright 156 and base member 146. Additional horizontal and vertical members may be included in panel 130, as illustrated, for structural support and rigidity. Panels 130 and 132, being mirror images of one another have equivalent structures and equivalent dimensions. Moreover, panel 132 is secured to front section 28 like panel 130 is secured to front section 24 as described above. Panels 130 and 132 are secured to one another by a plurality of hinges, such as hinges 158 extending between respective uprights 150. A doors 40, 42 are hingedly secured within door frames 152 of panel 130, 132, respectively, in the conventional manner.

Figure 4:
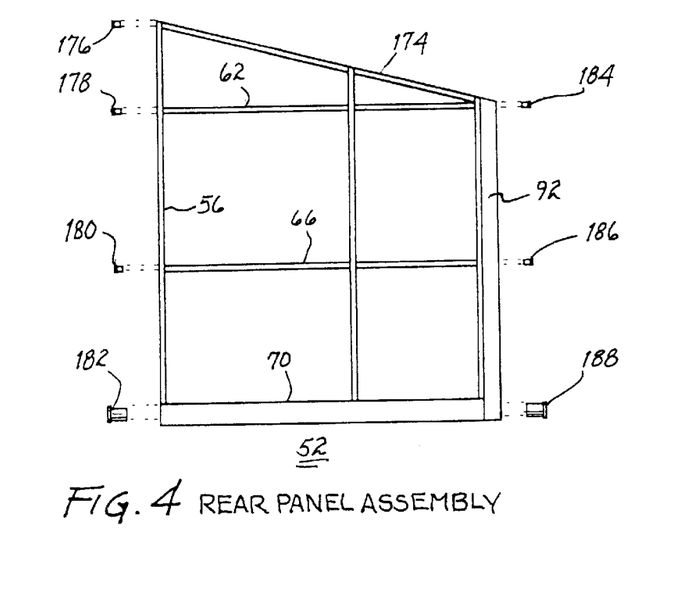
FIG. 4 illustrates one of the rear panels.

Rear wall 16 is formed by the pair of mirror image first and second walls 50, 52, as shown in FIG. 2. Rear panel 52 is illustrated in FIG. 4 and it is to be understood that rear panel 50 is a mirror image thereof and includes equivalent structure and function. As alluded to above, a plurality of hinges 176, 178, 180 and 182 interconnect upright 56 of panel 52 with upright 54 of panel 50. These hinges positionally correspond with the ends of cross members 62, 66, base member 70 and slanted member 174. Further hinges 184, 186 and 188 positionally corresponding with cross members 62, 66 and base member 70 interconnect upright 92 with upright 90 of rear section 30.

From the above description it becomes evident that panels 50, 52 of rear wall 16 are pivotally attached to one another and to respective ones of rear sections 26, 30. Similarly, panels 130, 132 of front wall 18 are pivotally attached to one another and hingedly attached to front sections 24, 28.

The above described cross members and uprights for the front and rear walls and roof supports may be formed of square tubular material, preferably aluminum due to its light weight and structural strength. As partly shown in FIG. 1, side walls 12, 14 are formed of cross members and uprights with sheet material extending there across. These cross members and sheet material may be commensurate with that of the front and rear walls and the roof sections. Moreover, the illustrated sheet material supported by the cross members and uprights of the side walls may be of aluminum for its advantages of light weight, structural integrity and weather resistence. It is understood that other materials for the cross members, uprights and sheet material may be used as a function of structural strength, weather resistence and cost.

Figure 5:
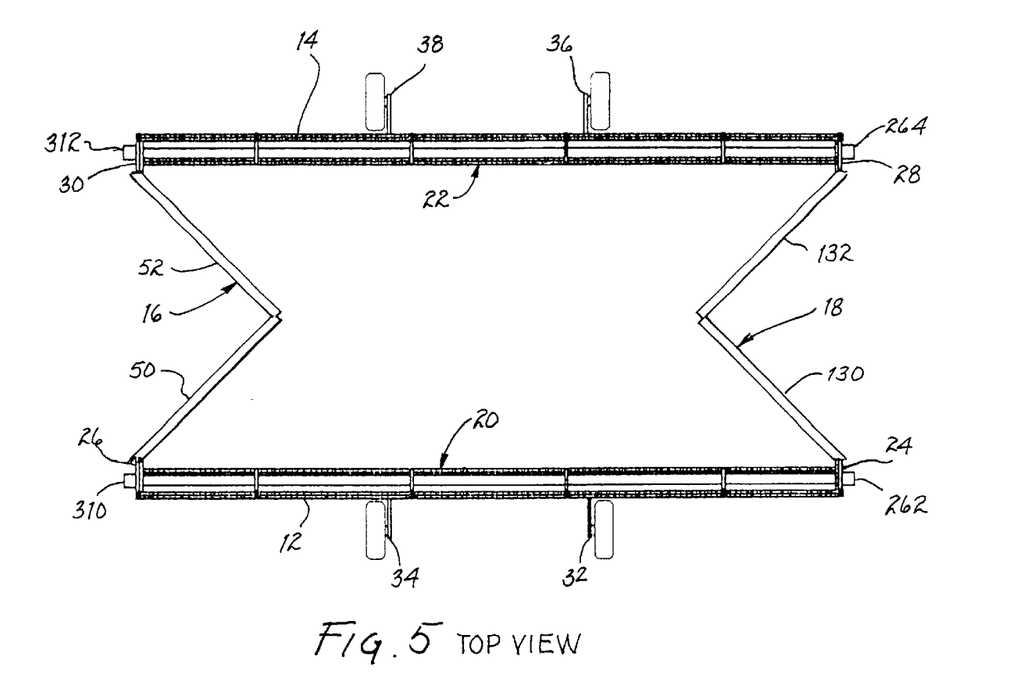
FIG. 5 is a top view of the building illustrating partial folding/unfolding.

Referring to FIG. 5, there is illustrated a top view of building 10 representative of either folding or unfolding of the front and rear walls relative to the side walls. In particular, wheel assemblies 32, 34, 36 and 38 are oriented orthogonal to side walls 12, 14 to permit movement of the side walls toward and away from one another while being supported by the wheel assemblies. Upon such movement of the side walls, front wall 28, formed of panels 130, 132, pivot with respect to one another and the respective side walls to locate the panels adjacent one another and intermediate the side walls. Similarly, rear wall 26, formed of first wall 50 and second wall 52, pivot with respect to one another and the side walls to locate the panels adjacent one another and intermediate the side walls. During erection of building 10, side walls 12, 14 are drawn apart resulting in unfolding of front wall 28 and rear wall 26. The movement of the side walls toward and away from one another may be as a result of manual exertion or mechanical means in the form of a block and tackle, jackscrews, etc., may be used. The choice of manual force or mechanical force is primarily a function of the size and weight of building 10.

Figure 6:
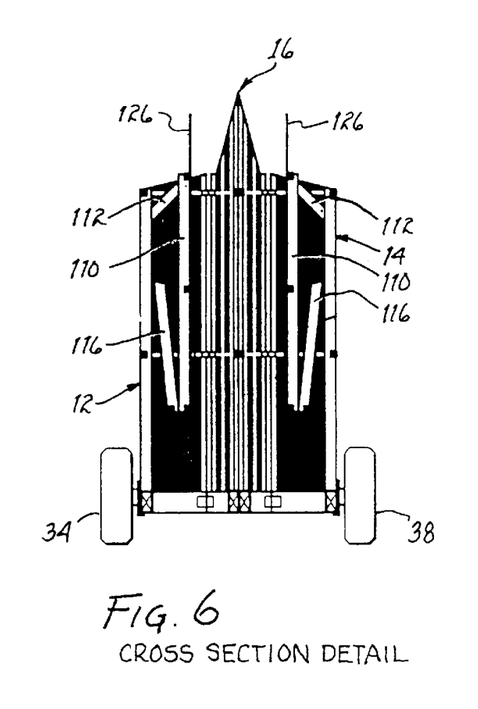
FIG. 6 is a cross sectional view taken along lines 6—6, as shown in FIG. 8.
Figure 7:
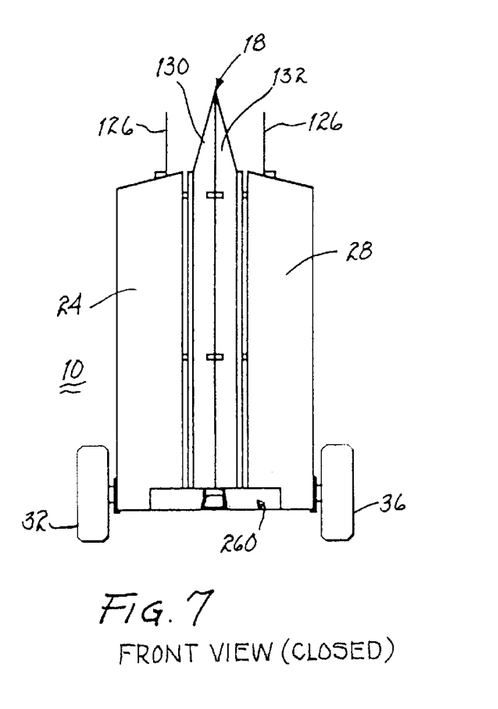
FIG. 7 is a front end view of the building ready for trailering.
Figure 8:
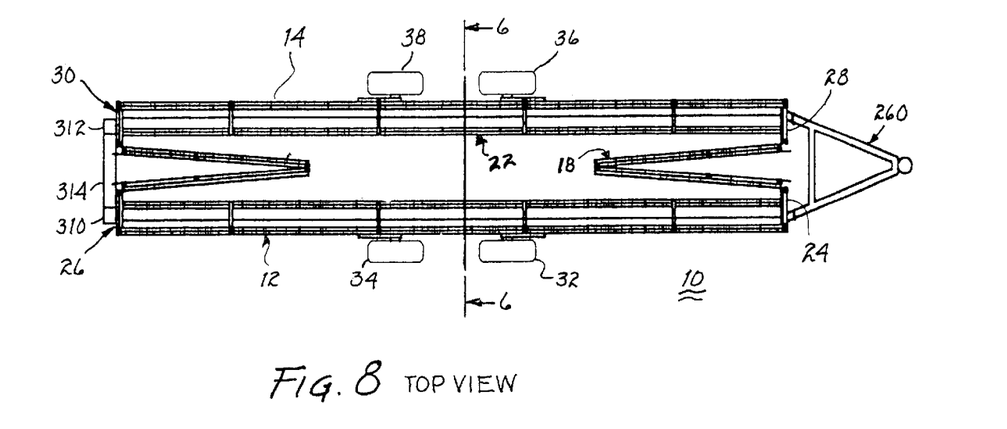
FIG. 8 is a top view of the building ready for trailering.

Referring jointly to FIGS. 1, 2, 5, 6, 7 and 8 the folding and unfolding of foldable roofs 20, 22 will be described. Second arm 116 is folded back upon first arm 110 by operation of the hinge at the pivot point 118. Thereafter, arm 110 is folded downwardly about pivot point 115 (and commensurate hinge). The resulting configuration is illustrated in FIG. 6 and shown in top view in FIG. 8. Corresponding arms 116 and 110 of foldable roof 22 are similarly folded and also depicted in FIGS. 5 and 6. Thereafter, front and rear walls 18, 16 are folded, as described above to locate them in their folded state intermediate foldable walls 20, 22 as shown in FIGS. 5, 6 and 8.

To erect building 10, side walls 12, 14 are drawn apart, as depicted in FIG. 5, to unfold front and rear walls 28, 26. Thereafter, foldable roofs 20, 22 are unfolded to bring them to their erected state, as illustrated in FIGS. 1 and 2 wherein foldable roof 20 is shown as partly unfolded and foldable roof 22 is shown a fully unfolded.

Figure 9:
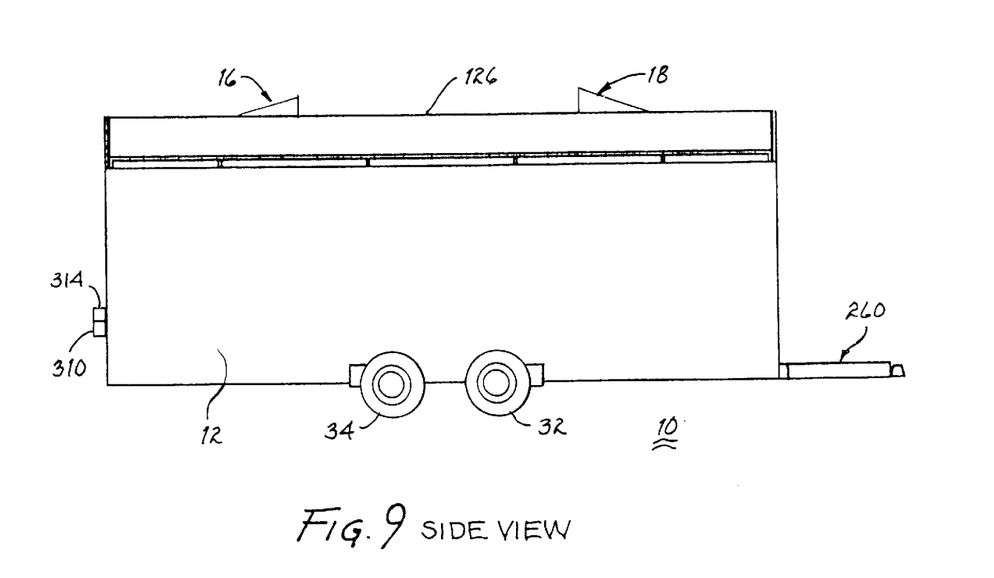
FIG. 9 is a side view of the building ready for trailering.
Figure 10:
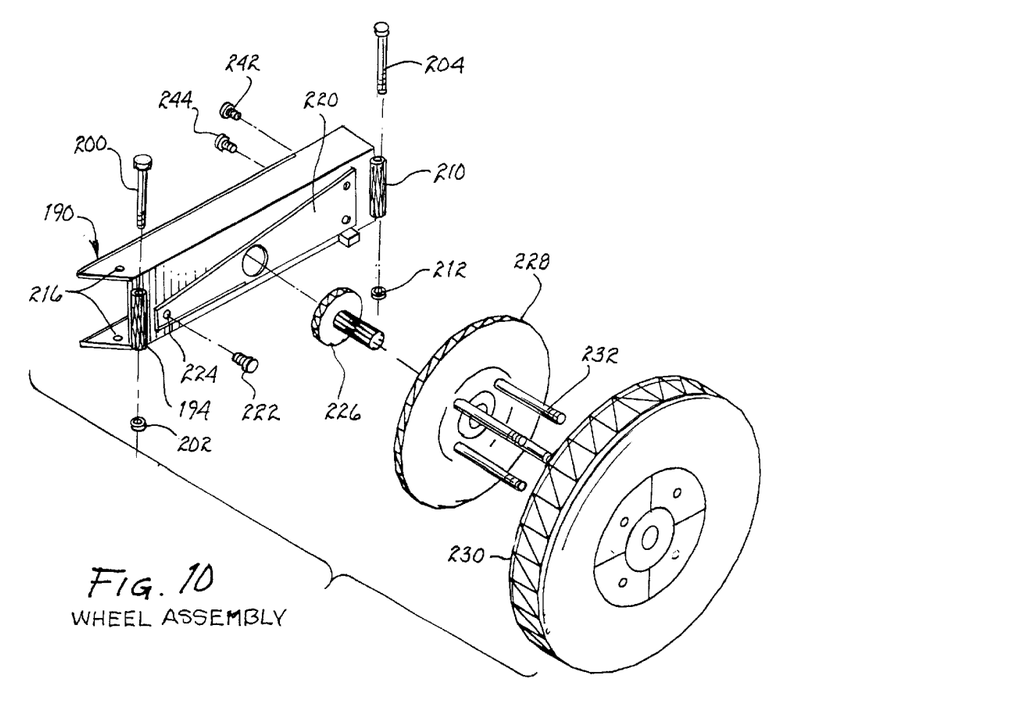
FIG. 10 is an exploded view of a wheel assembly.

As shown in FIGS. 7, 8 and 9 in the folded state of building 10, front sections 24, 28 and rear sections 26, 30 are visible. Foldable roof 20 is located between front section 24 and rear section 26 and foldable roof 22 is located between front section 28 and rear section 30. Panels 130, 132 of front wall 18 and panels 50, 52 of rear wall 16 are in their folded state intermediate foldable roofs 20 and 22. It may be noted that extensions 126 of the foldable roofs extend upwardly from the respective foldable roof.

Figure 11:
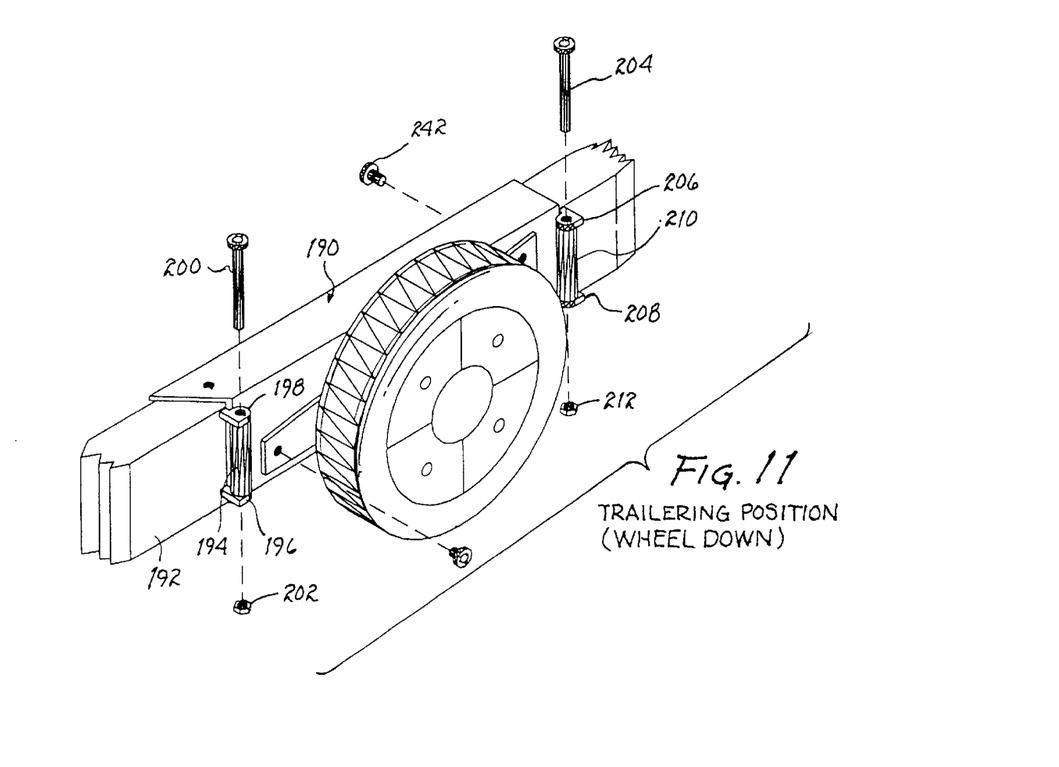
FIG. 11 illustrates the wheel assembly in position for trailering.
Figure 12:
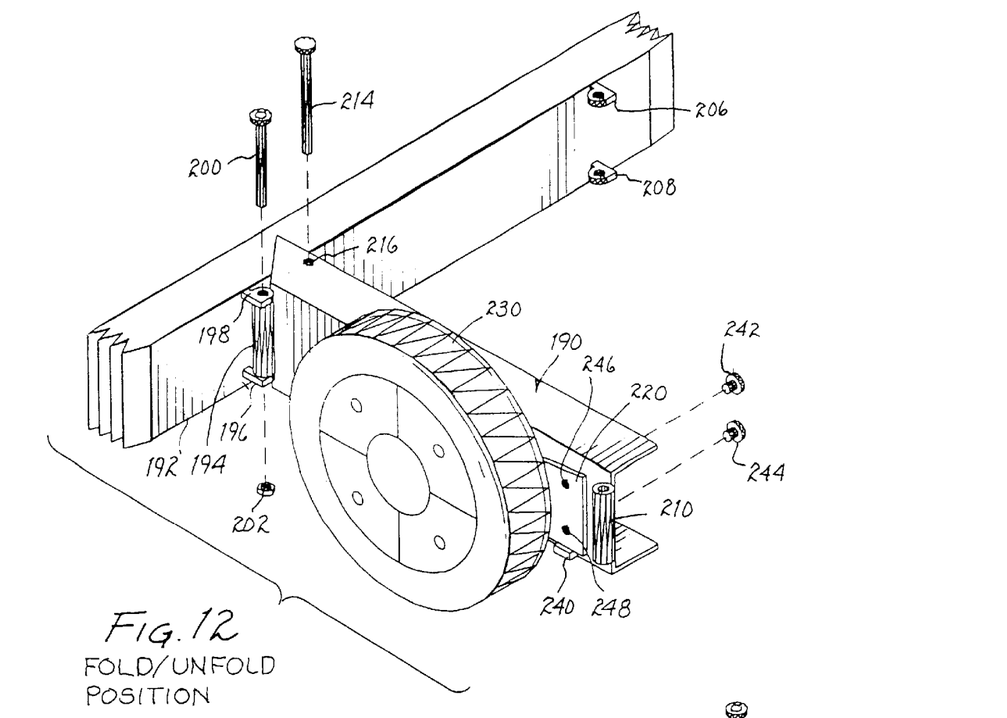
FIG. 12 illustrates a wheel assembly in position for folding/unfolding the building.
Figure 13:
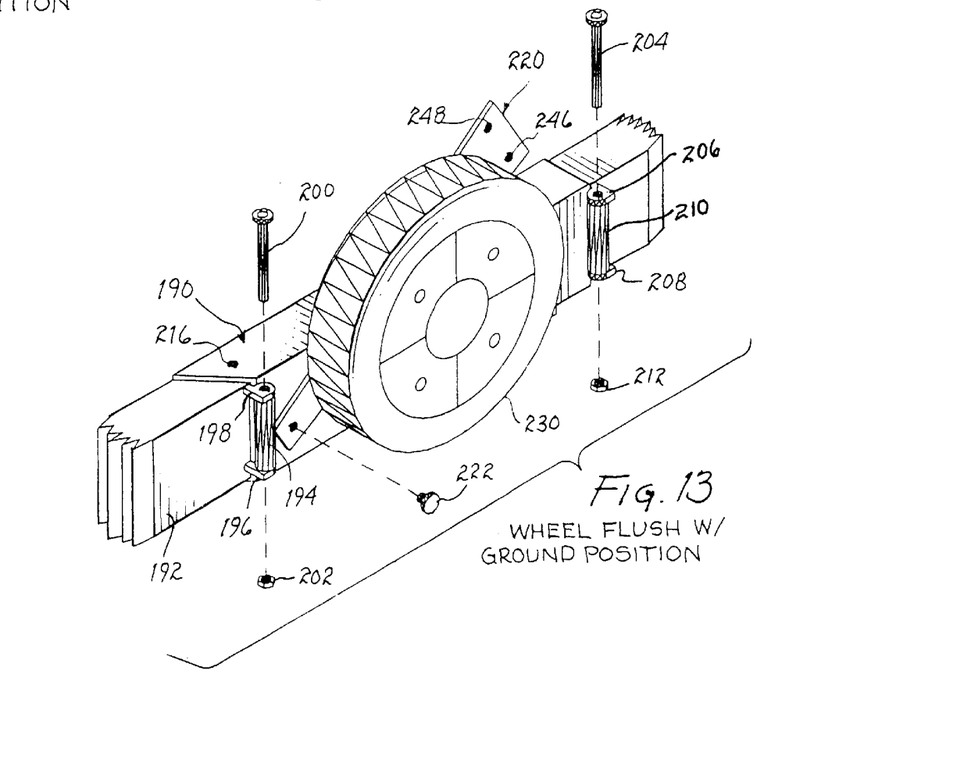
FIG. 13 illustrates the wheel assembly in a retracted position.
Figures 14, 15:
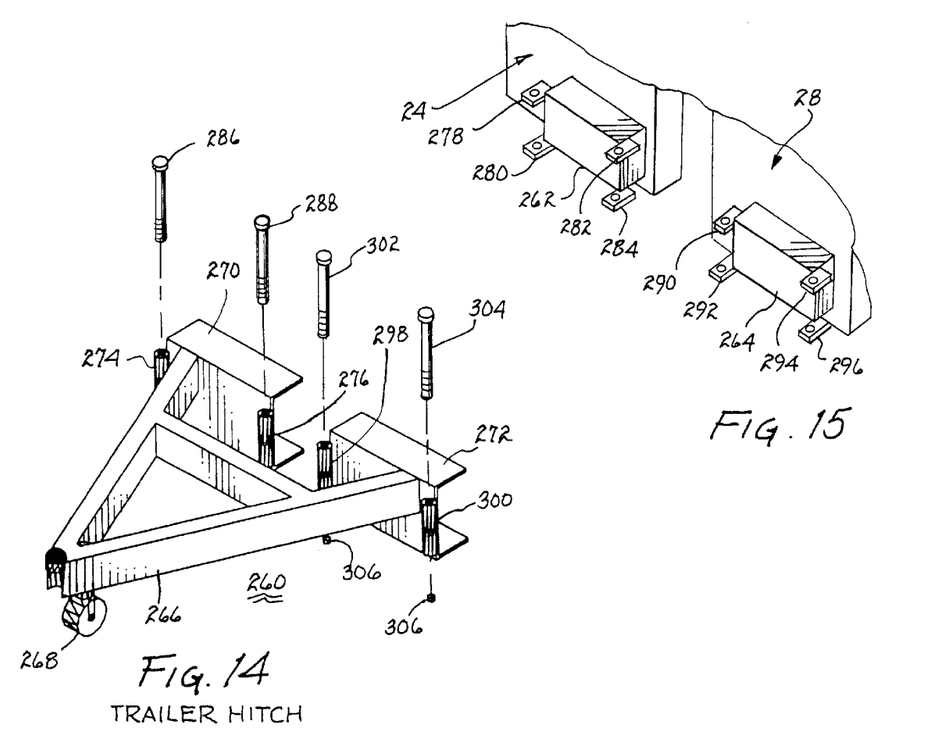
FIG. 14 illustrates the hitch assembly.
FIG. 15 illustrates the attachment points for the hitch assembly.

FIGS. 6 and 7 illustrate wheel assemblies 32, 34, 36 and 38 oriented in the configuration for trailering building 10. The structure and operation of these wheel assemblies will be described in further detail with joint reference to FIGS. 10, 11, 12 and 13. A C-channel 190 is pivotally secured to a base member 192 formed along the lower edge of each of side walls 12, 14 by a cylinder 194 attached to the C-channel and located intermediate a pair of apertured ears 196, 198 extending from the base member. The cylinder is retained in place by a bolt 200 extending through the ears and the cylinder and secured in place by a nut 202. Thereby, the C-channel can pivot from a position adjacent base member 192 as shown in FIGS. 11 and 13 to a position orthogonal to the base member, as illustrated in FIG. 12. Such orientation controls the position of the wheel assemblies, as shown in FIGS. 5 and 9. The C-channel is retained in position adjacent the base member by a bolt 204 penetrably engaging ears 206, 208 extending from the base member and a cylinder 210 secured to the C-channel. A nut 212 may be employed to retain bolt 204 in place. The C-channel is retained in its extended position illustrated in FIG. 12 by a bolt 214 extending through apertures 216 formed in the flanges of the C-channel. A pivot plate 220 is pivotally attached to C-channel 190 by a bolt 222 extending through an aperture 224 into engagement with the C-channel. A spindle 226 is attached to and extends from the pivot plate and supports brake drum/wheel mounting 228. Wheel 230 is attached to the mounting by penetrable engagement with threaded studs 232 and lugs (not shown) threadedly engaging the studs. C-channel 190 includes a ledge 240 for supporting pivot plate 220. The pivot plate is retained adjacent the ledge by bolts 242, 244 penetrably extending through the C-channel and into engagement with threaded apertures 246, 248 of the pivot plate; alternatively, the bolts may extend through the pivot plate into the C-channel or conventional nut and bolt means may be used. To remove the load of the building from the wheel assemblies, bolts 242, 244 are disengaged, which disengagement permits pivot plate 220 to rotate upwardly, as shown in FIG. 13, to raise wheel 230 and permit the base member 192 (of each side wall) to rest upon the building supporting surface.

Referring jointly to FIGS. 5, 7, 8, 9, 14 and 15, hitch 260 and its detachable attachment to building 10 will be described. Front sections 24 and 28 include mountings 262, 264, respectively, for engagement with the hitch. Hitch 260 includes a conventional A-frame shaped tongue 266, which may include an extendable/removable wheel 268 to assist in movement of building 10 when the building is in its folded configuration and ready for trailering purposes. A pair of C-channels 270, 272 are secured to tongue 266 by welding or other conventional means. These C-channels are configured to nestingly receive the respective one of mountings 262, 264. C-channel 270 includes a pair of cylinders 274, 276 which are in vertical alignment with pairs of apertured ears 278, 280 and 282, 284, respectively extending from mounting 262. Secure attachment of C-channel 270 with mounting 262 is accomplished by penetrable engagement of bolt 286 through ear 278, cylinder 274 and ear 280. Similarly, bolt 288 is in penetrable engagement with ear 282, cylinder 276 and ear 284. Similarly, mounting 264 includes two pairs of ears 290, 292 and 294, 296. These pairs of ears are in alignment with cylinders 298, 300 attached to C-channel 272 upon nesting engagement of C-channel 272 with mounting 264. Mounting C-channel 272 is retained in place by bolt 302 penetrably engaging ear 290, cylinder 298 and ear 292 and by bolt 304 penetrably engaging ear 264, cylinder 300 and ear 296. Bolts 286, 288, 302 and 304 may be retained in place by one of nuts 306.

From this description, it is evident that hitch assembly 260 serves two purposes. First, it serves as a mechanism for connecting building 10 to a draft vehicle, such as a truck. Second, the engagement of the hitch with front sections 24, 28 precludes sides 12 and 14 from becoming separated during trailering. Furthermore, the ease of attaching and detaching the hitch contributes very little to the time required to unfold and fold building 10.

Figures 16, 17:
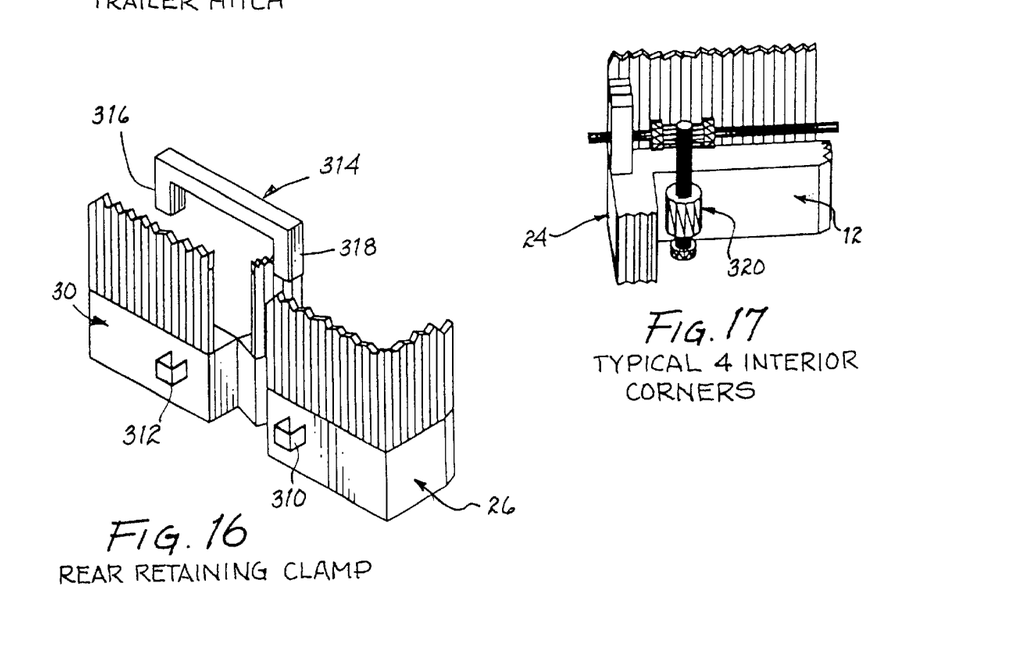
FIG. 16 illustrates the retention elements at the rear of the building ready for trailering.
FIG. 17 illustrates a typical jack usable to raise and lower a corner or section of the building.

Rear sections 26, 30 include a pair of receivers 310, 312 shown in FIGS. 5 and 16 which may be in the illustrated configuration of C-channels having vertically aligned longitudinal axes. A bar 314 has a pair of depending legs 316, 318 for penetrable engagement with receivers 312, 310. Thereby, engagement of the bar with the receivers will lock rear sections 26, 20 to one another when building 10 is in the folded state and separation between side walls 12 and 14 is precluded during trailering.

FIG. 17 illustrates a jack 320 which may be disposed at the corners of side wall 12 with front section 24 and rear section 26 and at the corners of side wall 14 with front section 28 and rear section 30. The purpose of the jack is to permit easy raising and lowering of the respective side walls to permit realignment of the wheel assemblies and to permit raising of the wheel assemblies after building 10 has been erected. Similarly, these jacks are used to permit lowering of the wheel assemblies in preparation for folding of the building for storage or trailering purposes.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

We claim:

1. A foldable trailerable building, said building comprising in combination:
   a) a pair of sidewalls;
   b) a bifold front wall pivotally connected to said pair of sidewalls;
   c) a bifold rear wall pivotally connected to said pair of sidewalls;
   d) a first foldable roof pivotally attached to one side wall of said pair of sidewalls;
   e) a second foldable roof pivotally connected to the other side wall of said pair of side walls;
   f) first wheel assembly secured to one side wall of said pair of side walls and positionable in a first orientation during folding and unfolding of said building and in a second orientation during trailering of said building;
   g) a second wheel assembly secured to said other side wall of said pair of side walls and positionable in the first orientation during folding and unfolding of said building and in a second orientation during trailering of said building; and
   h) a hitch assembly for trailering said building.

2. A foldable trailerable building as set forth in claim 1 wherein said hitch assembly includes means for detachably attaching said hitch assembly to said building.

3. A foldable trailerable building as set forth in claim 1 including a mounting disposed at one end of each side wall of said pair of side walls enabled for detachable engagement by said hitch assembly.

4. A foldable trailerable building as set forth in claim 3 including a bar enabled for securing the other end of each side wall of said pair of side walls to one another.

5. A foldable trailerable building as set forth in claim 1 wherein each side wall of said pair of side walls includes a front section extending laterally therefrom for pivotally supporting said bifold front wall and a rear section extending laterally therefrom for pivotally supporting said bifold rear wall.

6. A foldable trailerable building as set forth in claim 5 including at least a door frame disposed in said bifold front wall and at least one door pivotally attached to said door frame.

7. A foldable trailerable building as set forth in claim 1 wherein each said bifold front wall and said bifold rear wall includes an apex at the center thereof.

8. A foldable trailerable building as set forth in claim 1 wherein each of said first and second foldable roofs includes a plurality of first arms pivotally attached to the respective one of said pair of sidewalls for supporting sheet material forming a part of the roof surface upon erection of said plurality of first arms and a plurality of second arms pivotally attached to the respective ones of said plurality of first arms for supporting further sheet material forming a further part of the roof surface upon erection of said plurality of second arms.

9. A foldable trailerable building as set forth in claim 8 wherein said further sheet material overlaps said sheet material upon erection of said plurality of second arms.

10. A foldable trailerable building as set forth in claim 9 wherein said sheet material extends beyond the top of the respective one of said pair of sidewalls to form an eave upon erection of said plurality of first arms.

11. A foldable trailerable building as set forth in claim 8 including means for pivoting said plurality of second arms and said further sheet material toward the respective one of said pair of sidewalls to locate said plurality of second arms adjacent said plurality of first arms and means for pivoting said plurality of first arms to locate said plurality of first arms essentially parallel with the respective one of said pair of side walls.

12. A foldable trailerable building as set forth in claim 11 wherein each side wall of said pair of sidewalls includes a front section extending laterally therefrom for pivotally supporting said bifold front wall and a rear section extending laterally therefrom for pivotally supporting said bifold rear wall and wherein each of said first and second foldable roof is, in its foldable state, within the space defined essentially by the respective one of said pair of sidewalls and the corresponding ones of said front and rear sections.

13. A foldable trailerable building as set forth in claim 11 wherein each side wall of said pair of sidewalls includes a front section extending laterally therefrom for pivotally supporting said bifold front wall and a rear section extending laterally therefrom for pivotally supporting said bifold rear wall and wherein each of said bifold front wall and bifold rear wall in their foldable state are disposed intermediate said first and second foldable roofs in their foldable state.

14. A foldable trailerable building as set forth in claim 1 including a front end cap roof removably supported by said bifold front wall and enabled to serve as an eave and a rear end cap roof removably supported by said bifold rear wall and enabled to serve as a further eave.

15. A method for installing a building at a site, which building includes a pair of side walls, a bifold front wall pivotally connected to one end of the pair of side walls, a bifold rear wall pivotally connected to the other end of the pair of side walls, a first foldable roof connected to one of the pair of side walls, a second foldable roof connected to the other of the pair of side walls and a wheel assembly connected to each side wall, said method comprising the steps of:
   a) drawing the side walls apart from one another to unfold each of the bifold front and rear walls;
   b) unfolding each of the first and second foldable roofs; and
   c) lowering the building to rest the pair of side walls and bifold front and rear walls on the site.

16. The method as set forth in claim 15 including the step of trailering the building to the site.

17. The method as set forth in claim 16 including the step orienting each of the wheel assemblies to provide rolling support to the pair of side walls during exercise of said step of drawing.

18. The method as set forth in claim 17 including the step of raising the wheel assemblies prior to exercise of said step of lowering.

19. The method as set forth in claim 16 wherein the building includes a trailer hitch and including the step of maintaining the pair of side walls in a folded state with the trailer hitch during exercise of said step of trailering.

20. The method as set forth in claim 19 wherein the building includes a bar and including the step of maintaining the pair of side walls in a folded state with the bar during exercise of said step of trailering.

21. The method as set forth in claim 20 including the step of disengaging the trailer hitch and the bar from the side walls prior to exercise of said step of drawing.

22. The method as set forth in claim 21 including the step of attaching roof end caps to each of the front and rear bifold walls.

23. A method for installing a building at a site, which building includes a pair of side walls, a bifold front wall pivotally connected to one end of the pair of side walls, a bifold rear wall pivotally connected to the other end of the pair of side walls, a first foldable roof connected to one side wall of the pair of side walls, a second foldable roof connected to the other side wall of the pair of side walls and a wheel assembly connected to each side wall, said method comprising the steps of:

a) raising the building off the site to rest upon the wheel assemblies;

b) folding each of the first and second foldable roofs adjacent the respective one of the pair of side walls;

c) urging the pair of side walls toward one another to fold the bifold front and rear bifold walls therebetween and adjacent the respective one of the first and second foldable roofs;

d) reorienting the wheel assemblies ninety degrees (90°); and e) attaching a trailer hitch to the pair of side walls.

24. The method as set forth in claim 23 including the step of trailering the building from the site.

25. The method as set forth in claim 23 wherein said step of attaching includes the step of precluding displacement of the front end of the pair of side walls from one another and including the step of securing a bar at the rear end of the pair of side walls to preclude separation of the rear ends of the pair of side walls.

26. The method as set forth in claim 23 including the step of detaching roof end caps from the front and rear bifold walls.

* * * * *